United States Patent [19]

Schubert

[11] Patent Number: 4,757,980
[45] Date of Patent: Jul. 19, 1988

[54] PARAMETRICALLY CONTROLLED ACTIVE VIBRATION ISOLATION SYSTEM

[75] Inventor: Dale W. Schubert, Sudbury, Mass.

[73] Assignee: Barry Wright Corporation, Newton, Mass.

[21] Appl. No.: 106,567

[22] Filed: Oct. 6, 1987

Related U.S. Application Data

[63] Continuation of Ser. No. 760,850, Jul. 31, 1985, abandoned, which is a continuation-in-part of Ser. No. 716,026, Mar. 26, 1985, abandoned.

[51] Int. Cl.$^4$ .................... F16M 1/00; F16M 13/00; F16F 9/04; B64C 17/06
[52] U.S. Cl. .................... 267/136; 248/550; 248/638; 267/64.23; 318/649
[58] Field of Search ............. 188/378–380, 188/279, 299, 1.11, 322.14; 267/136, 137, 113, 123, 126, 140.1, 64.15, 64.21, 64.23, 64.24, 64.19, 217; 280/707, 708, 714; 137/554; 91/1, 361, 363; 73/654; 248/542, 550, 562, 636, 638, 559; 318/649

[56] References Cited

U.S. PATENT DOCUMENTS

| | | | |
|---|---|---|---|
| 2,487,029 | 11/1949 | Piety | 73/654 X |
| 4,065,154 | 12/1977 | Glaze | 280/707 |
| 4,153,237 | 5/1979 | Supalla | 267/64.15 |
| 4,216,795 | 8/1980 | Cobb et al. | 137/554 |
| 4,483,425 | 11/1984 | Newman | 188/378 |
| 4,546,960 | 10/1985 | Abrams et al. | 267/136 |

Primary Examiner—Andres Kashnikow
Assistant Examiner—Robert J. Oberleitner
Attorney, Agent, or Firm—Schiller, Pandiscio & Kusmer

[57] ABSTRACT

A parametrically controlled active vibration isolation system comprises a damper having a servovalve fluidically coupling a load supporting actuator to an accumulator. The servovalve includes a variable orifice arrangement which regulates the flow therethrough of a hydraulic fluid in response to a command signal derived from response sensors. In this manner the damping coefficient is modulated so as to approximate a "skyhook" damper.

27 Claims, 2 Drawing Sheets

PARAMETRICALLY CONTROLLED ACTIVE VIBRATION ISOLATION SYSTEM

RELATED PATENT APPLICATION

This is a continuation of commonly owned Ser. No. 760,850, now abandon, which is a continuation-in-part of commonly owned, Ser. No. 716,026 filed Mar. 26, 1985 and now abandon, entitled "Active Vibration Isolation System," the disclosure of which is hereby incorporated, and is related to copending application Ser. No. 760,863, now U.S. Pat. No. 4,742,998, "Active Vibration Isolation System Employing An Electrorheological Fluid".

BACKGROUND OF THE INVENTION

The invention relates to a vibration isolation apparatus and method, and more particularly to a supportive or suspension system adapted to be coupled between two elements or structures for the reduction of transmitted mechanical excitations therebetween.

Consider a conventional single degree of freedom vibration isolation system using linear viscous damping such as is presented in FIG. 1. The forces acting on the payload of mass "M", designated by the numeral 2, which is isolated relative to a foundation 3, are the spring force which is described as being equal to the spring stiffness constant "K" times the compression of spring 4 which is the isolator relative deflection, and the dissipation force which is the linear damping coefficient "C" times the rate of compression of viscous damper 6 which is the relative velocity. These two forces must be counteracted by the isolated payload mass 2 inertial force which is the payload mass coefficient "M" multiplied by the acceleration of the payload mass itself.

In the vibration isolation field it is well known that damping in linear viscous systems controls the resonant characteristics of the entire vibration isolation system. Adding damping lowers the detrimental effect of the resonance amplification. However, as the damping is increased, resonance amplification does indeed go down but the degree of high frequency vibration isolation is lowered. In fact, if the fraction of critical damping is set to unity to eliminate the effect of resonance amplification, almost all vibration isolation is lost. Even at very high frequencies above the resonant frequency, the rate of vibration isolation only increases by six decibels per octave.

Another well-known type of vibration isolation system is one in which the resonant amplification is well controlled by viscous damping but it does so in a manner so as to preserve the vibration isolation offered at high frequencies. This type of vibration isolation system uses a linear viscous damper connected to the isolated payload so as to act as a "sky hook"; the configuration of this type of vibration isolator is presented in FIG. 2. In this figure, the linear viscous damper 6 is connected to the isolated payload 2 at one end and to a stationary location in space at the other end, known as a "sky hook" 8.

It is the stationary connection which makes the passive "sky hook" damped system impossible to construct. For in the world of vibrations all masses that are accessible to the vibration isolation system are also in motion and thus do not act as a true "sky hook". Such a system can be approximated by using active vibration isolation techniques taught in my earlier patent application of which this is a continuation in part. But my earlier invention, like other active vibration isolation systems, is limited in its effectiveness in two areas. First, such systems are generally stability limited and thus cannot be just "slipped in place", so to speak, without the necessary system stabilization circuits tailored to suit the individual application. Secondly, such systems generally require power to operate and are limited in both force and motion output by power requirement limitations imposed by an individual design.

Desirable is an active vibration isolation system having a controlled damping coefficient such that its vibration isolation characteristics can be tailored as desired. Preferably, the characteristics can be tailored to approximate a "sky hook" damper.

Understanding of the present invention would be aided by a brief mathematical analysis of the "sky hook" type vibration isolation system as presented in FIG. 2. For this system, the damping force is equal to the payload's absolute velocity times the viscous damping coefficient of the damper.

The equation of motion for the "sky hook" damped vibration isolation system is presented in EQ (1);

$$M(d^2X) = K(U-X) - C(dX) \qquad (1)$$

In EQ (1), "dX" and "d²X" are the velocity and acceleration, X is the displacement of the payload, K is the spring stiffness constant, C is the damping coefficient, respectively, of the payload mass M, and "U" is the time-dependent displacement of the foundation or base relative to which the payload is isolated. (Throughout the specification, the time derivative shall be symbolized for convenience without the denominator, "dt" or "dt²")

One solution of this equation, for the case of steady state sinusoidal vibration, is the transmissibility vector equation for the "sky hook" damper vibration isolation system. In Laplace Transformation notation, the solution is as follows:

$$\frac{X[S]}{U[S]} = \frac{W^2_n}{[S + 2(\text{zeta}) SW_n + W^2_n]} \qquad (2)$$

where "$W^2_n$" is equal to "K" divided by "M", "zeta" is eqaual to "C" divided by the magnitude of critical damping, and "S" is the Laplace Operator.

The damping term associated with the system's fraction of critical damping, "zeta", appears in the denominator of the equation only. This is unlike the analogous solution for the system presented in FIG. 1 wherein the "zeta" term appears in both the numerator and denominator. This seemingly minor difference between the well-known equation for the transmissibility vector for the conventional isolation system and the equation for the "sky hook" damped isolation system has, however, profound effects in the manner in which viscous damping manifests itself in the overall vibration isolation characteristics. In the "sky hook" damped system, as the degree of damping is increased and the fraction of critical damping "zeta" approaches large values above unity, the amplification due to resonance disappears and vibration isolation starts at zero frequency with a peak transmissibility of unity occurring also at zero frequency. More importantly, the increase in damping used to eliminate the system's resonance also adds vibration isolation for all frequencies below the undamped resonant frequency.

For "sky-hook" type systems the effect of additional damping for small fractions of critical damping is virtually the same as for the conventionally damped vibration isolation system in the manner in which the amount of resonant amplification is reduced. However as the fraction of critical damping is increased, exceeding a value of approximately 0.2, it is observed that not only is the amplification of vibration due to the system resonance decreased but at the same time there is no loss of vibration isolation characteristics at frequencies above resonance. This effect continues even for very large fractions of critical damping.

Desireable, therefore, would be a realizable vibration isolation system which achieves or at least approximates the advantageous vibration isolation of a "sky hook" damped system.

Therefore, it should be apparent that an object of the present invention is to provide an active vibration isolation system exhibiting improved stability and requiring less power than conventional active systems.

A further object of the present invention is to provide a realizable vibration isolation system which is characterized by a transmissibility vector equation approximating that of a "sky hook" damped system, having substantially no resonant amplification.

SUMMARY OF THE INVENTION

These and other objects of the invention are achieved by a parametrically controlled active vibration isolation system comprising a first sensor for deriving a first velocity signal representative of the velocity of a payload, a second sensor for deriving a second velocity signal representive of the velocity of a base, a viscous damper disposed to support said payload with reference to said base, means for modulating the damping coefficient of said viscous damper in response to a command signal, feedback means for deriving a feedback signal representative of the damping coefficient, and electronic means for continuously generating the command signal in response to said first and second velocity signals and said feedback signal, whereby the damping coefficient of said viscous damper is controlled by automatic feedback and can approximate that of a "sky hook" vibration isolation system.

According to the preferred embodiment of the invention, both of the velocity sensors are geophones, and the modulating means includes electromechanical drive means responsive to the command signal for regulating the flow of hydraulic fluid through a servovalve. The servovalve preferably includes a unidirectional or bidirectional valve spool which acts to constrict fluid flow through a passage connecting an actuator with an accummulator. The actuator is adapted and configured to hydraulically support a payload with reference to a base on which the accummulator rests or to which it is secured.

The vibration isolation system as described and claimed herein is, in effect, an active system since sensors of motion and actuation implementation devices are required. This damping technique, however, does not require actuation devices which actively generate forces. Many of the disadvantages of more conventional active systems are eliminated because this variable damper generates damping forces passively, and uses active methods only to change the instantaneous value of the damping coefficient, a technique which requires less power.

The invention also embraces the method by which vibration isolation is achieved by such a system.

The above and other features of the invention, including various novel details of construction and combination of parts, will now be described with reference to the accompanying drawings and pointed out in the claims. It will be understood that the particular vibration control system embodying the invention is shown and described by way of illustration only and not as a limitation. The principles and features of this invention may be employed in varied and numerous embodiments without departing from the scope of the invention.

DETAILED DESCRIPTION OF THE PREFERRED EMBODIMENT

A. Overview of Basic System and Mathematical Description Thereof

Figure 2:
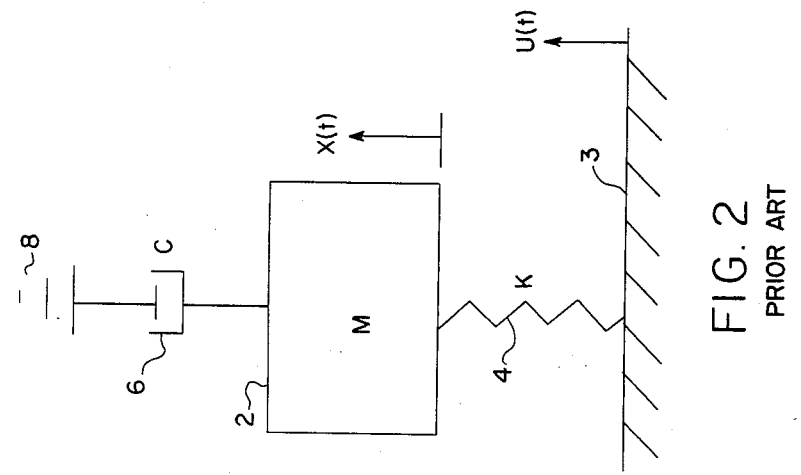
FIG. 2 is a schematic representation of a conventional vibration isolation system with a viscous damper connected as a "sky hook" damper.
Figure 1:
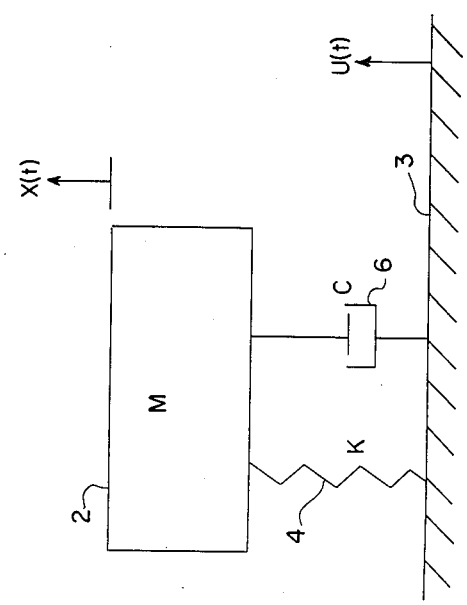
FIG. 1 is a schematic representation of a conventional vibration isolation system using linear viscous damping.
Figure 3:
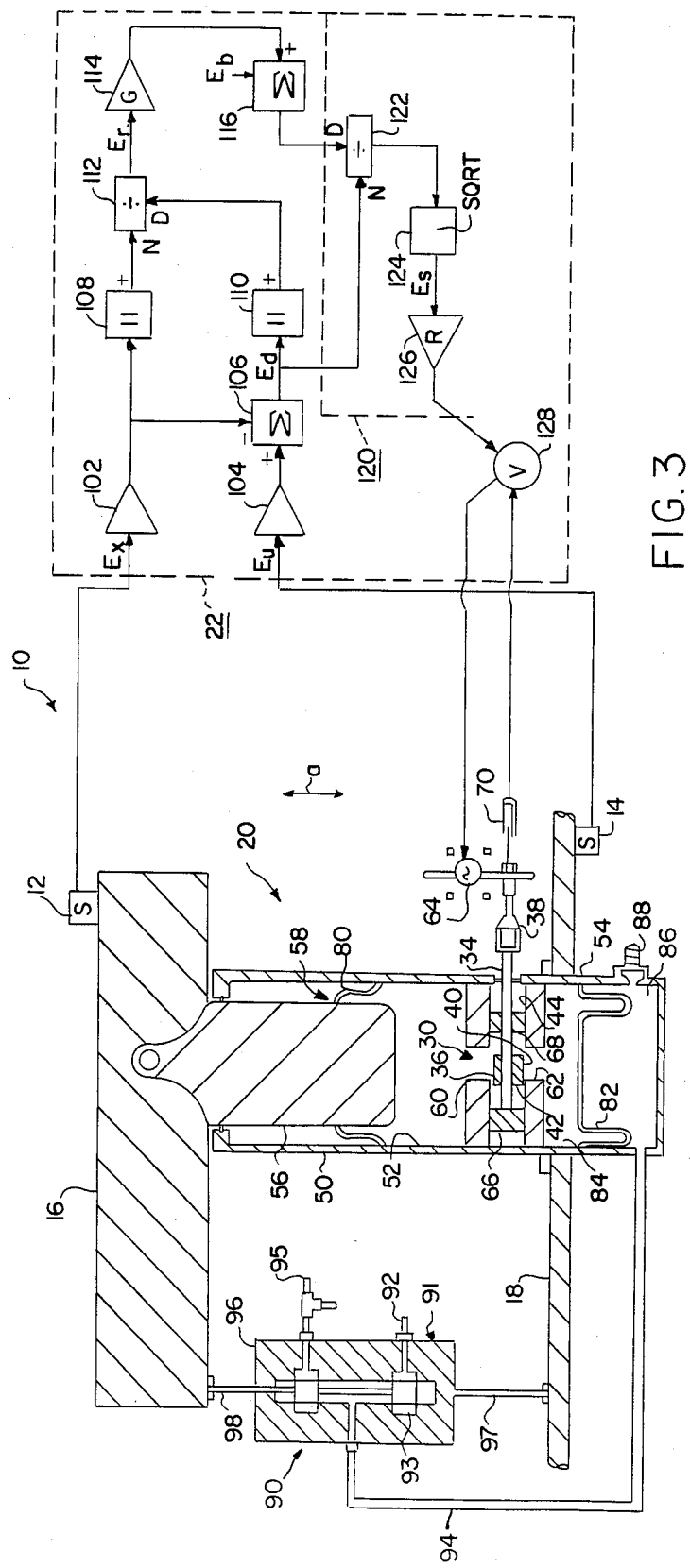
FIG. 3 is a schematic representation of a vibration isolation system with a variable damping coefficient viscous damper, made in accordance with the present invention.

FIG. 3 presents a parametrically controlled active vibration isolation system 10 made in accordance with the present invention, including two response sensors 12, 14 operatively coupled with a payload 16 and foundation or base 18 to derive a signal representative of the velocity of the payload 16 and of the base 18, dX and dU, respectively. It is recognized and discussed in the earlier application, of which this is a continuation-in-part, that the outputs from the two response sensors 12, 14 give only an approximation of the velocity due to the physics of the velocity sensors. The outputs may be processed appropriately to yield a more valid velocity signal.

It should be understood that vibratory excitations of the payload 16 or of the base 18 are isolated by the system 10, i.e., their transmission is reduced or eliminated for at least a range of frequencies thereof.

The system 10 further includes a variable damping coefficient viscous damper 20 controlled by a servo-controller 22. The output signal from the servo-controller 22, called herein a "command signal", is used to modulate the damping coefficient in a manner such that the instantaneous damping coefficient is described as shown in EQ (3).

$$\text{Damping Coefficient} = C = C_1[ABS(A[dX/dV])] \qquad (3)$$

where "A" is the instantaneous area of the orifice of the viscious damper, "$C_1$" is the damping coefficient when the orifice is fully open, "dX" is the velocity of the payload, "ABS is an abbreviation for "absolute value of", and "dV" is the relative velocity of the payload 16 with respect to the base 18 and is equal to "dU" minus "dX".

With the damping servo terms of the system established by EQ 3, and assuming sensors 12, 14 are identical so as to have identical transfer functions, a simplified differential equation of motion may be written to describe the vibration isolation system 10. Once again using the conventional force summation procedure for the spring, damper and mass inertial forces, an engineer in the art could derive EQ (4).

$$M(d^2X) = K[U-X] - C_1(dV)(ABS[A(dX/dV)]) \quad (4)$$

where M is the payload mass, K is the spring stiffness constant, U is the displacement of the base, and X is the displacement of the payload.

Carefully note that the relative velocity, "dV", appears in both the numerator and denominator of the damping term expression, and, if it were not for the fact that the synthesized damping coefficient term has no sign, the two terms would cancel exactly and mathematically form a true "sky hook" damped system. The damping term synthesized, however, has no sign since the feedback is used only to modulate the damping coefficient, "C". Realizing this, we can rewrite the equation with the terms cancelled. The differential equation of motion of EQ (4) simplifies to the form presented in EQ (5).

$$M(d^2X) = K[U-X] - C_1 A[ABS(dX)](DELTA) \quad (5)$$

Here the term "DELTA" is equal to plus or minus one (1) and represents the sign of the relative velocity. Compare EQ (5) with the equation for motion given in EQ (1).

The above mathematical description of the system is idealized in some respects and interfacing with the real world must be considered. The actual ratio of velocities as described above would have an infinite value if the voltage signal representing the absolute payload velocity were finite and the voltage signal representing the relative velocity were zero. This is a condition occurring twice each cycle with sinusoidal vibration and, thus, is a commonly occurring event. The servo-controller 22 cannot output an infinite voltage. Thus, the command signal must be limited to have some specified maximum value which will be called $U_{MAX}$, generally, for example, approximately 10 volts. The command signal, however, may still have all values between $-U_{MAX}$ and $+U_{MAX}$, including zero. In a real system, however, when the command is zero, there must always be some residual damping remaining. Thus, in a realizable system, the damping coefficient must have a minimum value which is hereinafter referred to as "$C_0$". This leads to a formulation of the command signal for a realizable system in the form presented in the EQ (6):

$$\text{Damping Coefficient} = C = C_0[1.0 + A(ABS(dX/dV))] \quad (6)$$

In an actual system, the term $C_0$ is the damping present when the command signal is zero, while the maximum value of the damping coefficient is equal to $C_0[1.0 + A(U_{MAX})]$.

Thus, an active vibration isolation system 10 has been modeled which is characterized by a transmissibility vector equation, EQ (5), approximating that of a "sky hook" damper given in EQ (1). Details of the elements of such a system shall now be described.

B. Electromechanical Viscous Damper 20

As just described, the vibration isolation system 10 in accordance with the present invention operates through the dynamic modulation of the viscous damping coefficient of an otherwise linear vibration isolator. A preferred method of modulating the viscous damping coefficient is shown in FIG. 3. The damper 20 includes a servovalve 30 which acts as electro-mechanical variable orifice means for metering the flow of the fluid used to provide the damping pressure drops and resulting dissipation forces. This flow control is achieved by regulated restriction of the flow path in response to an electrical signal input to the servovalve 30, called herein the "command signal".

The electro-mechanical servovalve 30 used in accordance with the present invention establishes a predetermined flow area which in turn sets the instantaneous coefficient of damping of the vibration isolation system to a prescribed magnitude. The servovalve 30 differs somewhat from conventional servovalves. Normally servovalves are utilized for controlling flow of fluid from a hydraulic or pneumatic pump which then generally causes the motion of the control system actuation device. The servovalve 30 does not control the flow from a pump, but rather establishes a predetermined valve opening allowing fluid flow in either direction. This takes place passively at whatever pressure conditions happen to occur at a given instant.

Vibration isolation depends on the time dependent modulation of the magnitude of the damping or dissipation force. The dissipation force is generated passively by the vibration isolation system 10 as relative velocities develop across a dissipation element. The dissipation force is equal to the instantaneous linear viscous damping coefficient, "C", multiplied by the relative velocity, and is the term to be acted upon and controlled in the present invention. Electro-mechanical control over the damping coefficient is achieved by the vibration isolation system 10 utilizing the servovalve 30 as a dissipation element within an incompressible fluid path to generate the damping or dissipation forces. The servovalve 30 includes electromechanical means for controllably varying the flow area therethrough and thereby modulating the damping coefficient of the vicious danger. The servovalve 30 includes a movable valve spool 32 including a rod or neck 34 connected to a cylindrical spool head 36 at or near one end and to a drive shaft 38 at the other end. The spool head 36 is of a disk-like shape, having an outer cylindrical surface or land 40, and planar end walls 42 connected to the land perpendicularly so as to form a substantially sharp edge therebetween. The spool 32 is arranged to be slidingly driven within a transverse passage 44 having an inner diameter which permits the spool head 36 to slide therein with a close fit.

The damper 20 in addition to the servovalve 30 comprises a support cylinder or receptacle 50 including two chambers 52, 54 having the servovalve 30 connecting them so as to provide regulated fluidic communication therebetween. The upper chamber 52 is a load bearing chamber, and, in combination with a payload support 56, forms a hydraulic single acting actuator 58 which is filled with an incompressible fluid of low and constant viscosity. The lower chamber 54 is a small hydraulic accumulator which acts to store incompressible hydraulic fluid at substantially a constant pressure.

As stated above, the function of the servovalve 30 is to meter the flow of hydraulic fluid according to a desired control function. Movement of valve spool 32 opens or closes orifices 60, 62 within the fluidic circuit as it is driven by the mechanical output of electromechanical means 64 to which it is operatively connected. Preferably the orifices 60, 62 are of identical size and configuration and direct the fluid flow perpendicularly against the cylindrical land 40 of the spool head 36.

The valve spool 32 can further include support heads 66, 68, in which case the rod 34 extends to connect all three heads 36, 66, 68. The support heads 66, 68 act to prevent cocking of the spool 32 within transverse passage 44 and are disposed in spaced arrangement on either side of the head 36.

Full opening of the orifices 60, 62 by the valve spool 32 must be scaled such that the minimum fraction of critical damping of the vibration isolation system is established under all anticipated vibration isolation system excitation velocities.

The allowable direction of travel of the servovalve spool 32 determines whether the servovalve 30 is of the unidirectional or bidirectional type. A valve spool 32 which displaces only in one direction forms a dedicated unidirectional servovalve, while a valve spool which displaces in both directions forms a bidirectional servovalve. The bidirectional servovalve, however, can behave the same as the unidirectional servovalve if the controlling signal to the valve commands only one direction of spool travel; thus the bidirectional servovalve can behave as both servovalve types in so far as the resulting vibration isolation system response is concerned.

The valve spool 32 is actuated by the electromechanical drive means 64 which is capable of applying a driving force to displace the rod 34 within passage 44 with reference to orifices 60, 62 in response to the command signal from the servo-controller 22. Thus, the drive means 64 serves to vary the opening of the variable orifice. Preferably, it comprises an electro-magnetic solenoid of a design such as is commonly used to drive a conventional loud speaker, although other forms of motors could be used. The controlling mechanical force applied to the valve spool 32 causes it to accelerate in the direction of the applied force. However, a feedback signal representative of the position of the spool head 36 relative to orifices 60, 62 is used by the servo controller 22 to control the electro-mechanical drive means 64. The feedback signal is representative also of the damping coefficient of the viscous damper 20 since it represents the instantaneous flow area. It is preferably derived by means 70 such as a displacement transducer, for example, a linear variable differential transducer ("LVOT") sensor operatively associated with the valve spool 32.

The flow of fluid through the servovalve 30 is proportional to two parameters; namely the pressure drop across the servovalve 30, and the flow area.

Let P1 represent the pressure within the actuator 58, measured, for example, in orifice 60, and let P2 represent the pressure within the hydraulic accumulator 54, measured for example in orifice 62.

Vibratory acceleration of the payload 16 causes an inertial force to be applied to the support cylinder 50. For most cases it can be safely assumed that the flow through the orifices 60, 62 is governed by EQ (7).

$$Q = C_d A[SQRT(2dP/V)] = A_c(dV) \tag{7}$$

Where "$C_d$" is the damping coefficient of the valve opening for the fluid, "SQRT" is an abbreviation for square root of the following function, "dP" is an incremental pressure due to vibration accelerations of the payload 16, "D" is the density of the fluid, and "$A_c$" is the load area of the supporting cylinder.

The other relating equation for this system is that of the damping force itself. The damping force is defined as:

$$\text{Damping Force} = F_d = A_c(dP) = C(dV) \tag{8}$$

The damping coefficient, "C", as controlled by the servocontroller 22 is already defined in EQ (3).

Letting "R" be the system scaling constants, defined by EQ (9), $$R = SQRT[A_c^3 D/(2C_d C_o)] \tag{9}$$

and substituting in the above equations yields the required servovalve's orifice area for regulated flow, given by EQ (10).

$$A = R(SQRT[ABS \ dU/(1 + G(ABS(dX/dV)))]) \tag{10}$$

where "G" is gain and R is the system's sealing constant.

Thus, to achieve the desired objectives of the invention, the flow area must be controlled in accordance with EQ (10). Generally the flow area is proportional to the valve spool's displacement. If this is the case, the valve stroke is likewise defined. Therefore, the command signal can be used to control the displacement of the valve spool 32 resulting in a corresponding change in the flow area in accordance with EQ 10, so as to exhibit a transmissibility vector equation for the vibration isolation system 10 approximating that of a "sky hook" damper. The electronics of the servo-controller as shall be described hereinbelow generates the command signal to regulate the flow area in accordance with EQ (10).

A further description of the viscous damper 20 and its operation shall now be provided.

The payload support 56 is securable to the payload 16 and received in a first end of the support cylinder 50 for piston-like movement therein in response to excitations in the direction indicated by an arrow, designated by the letter "a" in FIG. 3, which is parallel to the axis of the support cylinder. In the preferred embodiment, the displacement of valve spool 32 is in a direction perpendicular to direction "a".

As previously stated, the payload support 56 cooperates with the upper chamber 52 of the support cylinder 50 so as to form actuator 58. The actuator 58 is preferably a rolling diaphragm type hydraulic actuator which is suitable in instances wherein a low resonant frequency is required. The use of a rolling diaphragm 80 to interconnect and seal the payload support 56 to the inner wall of the support cylinder 50 reduces the high coefficient of friction normally associated with other forms of hydraulic actuators consisting of a cylinder and piston without a diaphragm.

The opposite end of the upper chamber 52 is fluidically coupled directly to the servovalve 30 which regulates the flow of fluid from the actuator 58 to the accumulator 54. The accumulator 54 stores the incompressible hydraulic fluid under pressure in a manner such that pressure changes due to fluid volume changes are small. The static pressure in the vibration isolation system 10 is controlled by a pressurized compressible fluid contained within the accumulator 54. A flexible fabric-reinforced elastomeric diaphragm 82 sealed to the inner wall of the support cylinder 50 separates the accumulator 54 into subchambers 84 and 86, having therein the hydraulic fluid and the compressible fluid, respectively. Due to diaphragm 82, subchambers 84, 86 each have variable volumes and therefor are expansible in response to relative pressure changes therein. The device utilized for the accumulator 54 can indeed by a commercially available hydraulic accumulator or the lower pressure version of the hydraulic accumulator, the hydraulic snubber.

The hydraulic fluid within the upper chamber 52 and subchamber 84 can be any incompressible fluid which is compatible with the system and the environment within which the system must function. Examples of the incompressible fluid are ordinary low viscosity hydraulic oil, brake fluids normally utilized in automotive braking systems, or mixtures of water and ethylene glycol type antifreeze if extremely low operating temperatures are required.

The compressible fluid in the subchamber 86, for example, can be a gas or ordinary air. The choice of the compressible fluid in conjunction with its volume and the area of the hydraulic load supporting actuator 58 establish the resonance characteristics of the vibration isolation system.

The function of the accumulator 54 is two-fold. First, the trapped compressible fluid acts as a pneumatic spring to give the vibration isolation system a substantially linear spring stiffness, defining the isolation system undamped natural frequency. The second function is to provide a reservoir for hydraulic fluid which is maintained under a moderately high and substantially constant pressure. This provides the lift in conjunction with the load support area of the support cylinder 50 to support the static load of the payload 16.

The compressible fluid is introduced into subchamber 86 by pneumatic fitting 88.

C. Optional Height Sensing and Control

The electromechanical viscous damper as heretofore described is suitable for applications in which the weight of the payload does not fluctuate appreciably. For those applications in which it does, manual introduction of the compressible fluid might be undesirable. Rather, a system for automatically adjusting the lift of the damper in response to the payload weight would be advantageous.

This can be achieved by employing a height sensing control device 90 to adjust the pressure of the compressible fluid in subchamber 86 so as to maintain the quiescent relative height of the payload 16. A supply of pressurized compressible gaseous fluid from a source (not shown) is coupled to a three-way valve 91 at inlet conduit 92. Axial positioning of a double-headed valve spool 93 regulates admission of pressurized fluid to the subchamber 86 by conduit 94. Valve spool 93 similarly regulates the relief of pressure from the subchamber 86 through the exhaust conduit 95.

Valve body 96 is secured to the base 18 by, for example, linkage 97 so as to be maintained against movement in the axial direction identified by arrow "a". The valve spool 93 is affixed to rod 98 which, at the other end thereof, is secured to payload 16. Relative height fluctuations of the payload 16 with respect to the base 18 introduce fluid flow into or release fluid flow from the subchamber 86 by the opening or closing of the fluid flow path. Thus the pressure in the subchamber 86 is adjusted automatically to accommodate different payload weights.

A further understanding of the height sensing and control device 90 can be had by reference to U.S. Pat. No. 2,965,372 issued Dec. 20, 1960 to R. D. Cavanaugh and entitled "Pneumatic Isolator", the disclosure of which is incorporated herein.

D. Response Sensors 12, 14

As discussed above, the payload 16 and the base 18 are provided with response sensors 12, 14 which generate or derive, after processing signals representive of the velocity of the payload 16, abbreviated "dX," and the velocity of the excitation of the base 18, abbreviated "dU", respectively.

Response sensor 12 is operatively coupled with the payload 16 either directly or via the payload support 56 which is secured to the payload 16. Response sensor 14 is operatively coupled with the base 18 either directly or via the support cylinder 50 which is secured to the base 18.

The response sensors 12, 14 can be accelerometers such as piezo-electric accelerometers, having their outputs integrated to yield a velocity signal, or electromechanical velocity sensors such as and preferably a geophone type mechanism. Geophones are discussed extensively in the earlier application, of which this is a continuation-in-part. The informational content of the sensor signals is not substantially utilized for frequencies below the isolation system undamped resonant frequency; thus the motion sensor frequency response need not extend down to extremely low frequencies.

The implementation of each of the sensors 12, 14 should be such that the sensor resonant frequency should be at least one octave in frequency below the resonant frequency of the isolation system actuator. This, then, limits the application of electro-mechanical velocity sensors such as geophones to vibration isolation systems having resonant frequencies above approximately ten cycles per second. Integrated accelerometers can be utilized as velocity sensors for vibration isolation systems having resonant frequencies below about ten cycles per second.

E. Electronic Servo-Controller 22

The servo-controller 22 shown in FIG. 4 uses the two velocity signals and the feedback signal to generate a control function to be applied to the electro-mechanical drive means 64 as the command signal in the form required by EQ (10) to vary the opening in the servo-valve. While an all analog system is shown, it can be converted to a digital system using analog to digital and digital to analog converters for communication with the response sensors 12, 14 and the servo-controller 22. These changes are well within the skill of an engineer in the art.

The flow path of the control system signals starts with applying the output voltages $E_X$ and $E_U$ from the sensors 12, 14 to coupling means 102, 104, respectively. The function of the coupling means 102, 104 is to convert the high impedance signal from the velocity sensors 12, 14 to low impedance signals which can undergo additional manipulation without the input impedances of other circuit elements altering them, i.e., impedance matching. The coupling amplifier means 102, 104 may include, where appropriate, circuit elements (not shown) such as an amplifier to establish a desired voltage scale factor for the velocity signal; and/or frequency manipulation circuits to artificially lower the resonant frequency of the sensor, or integration circuits to integrate the acceleration signals from accelerometer sensors where used for the response sensors 12, 14 instead of velocity sensors.

The circuit used to artificially lower the resonant frequency of the sensor comprises one or two operational amplifiers (not shown) used to generate a double lag-lead transfer function. Details of this circuit and the integration circuit are well within the skill of one in this art. Details of the synthesis of linear transfer functions utilizing operational amplifiers, can be found in my prior application, of which this is a continuation-in-part.

The output signals from the coupling amplifier means 102, 104 (which signals for simplicity shall be still referred to as $E_X$ and $E_U$, respectively) are fed to a subtraction circuit 106 to form a voltage signal, "$E_d$" which is the difference between the signals $E_X$ and $E_U$ and represents the relative velocity.

The signals $E_X$ and $E_d$ are then inputted into processing means 108, 110 for converting them to their absolute values.

The two absolute valued signals are then fed into an analog divider circuit 112 which also acts as an output voltage limiter, $E_X$ is fed to the numerator and $E_d$ is fed to the denominator.

The divider circuit's output is the velocity ratio $E_R$ which is limited to voltages under the maximum magnitude $E_1$.

The velocity ratio $E_R$ is then applied to the input of an amplifier 114 having gain G.

Next, the amplified velocity ratio signal is fed to a summer 116, where a constant voltage "$E_b$" of, for example, 1.0 volt is added to the velocity ratio as a bias. The output of the summer 116 is a control function signal.

The remaining control electronics compensate for specific characteristics of the servovalve 30 used in the vibration isolation system 10. For example, for the electro-mechanical servovalve 30 described herein, these characteristics are the velocity squared nature of non-viscous fluid flow damping, and the nature of the displacement and positioning of the valve spool 32. The description of these compensation circuits 120 follows.

The control function signal from the summer 116 is applied as the denominator, and the relative velocity voltage $E_d$ from the subtracting summer 106 is applied as the numerator, of a second divider 122.

The circuitry shown in FIG. 3 is for a bidirectional servo valve. For a unidirectional servo valve, the signal representing the relative velocity dV will be applied to the second divider 122 from the output of the processing means 108, 110 instead of from the subtraction circuit 106, thus insuring that the output of the second divider 122 will always be of one polarity.

The second divider's output is fed to a square root function generator 124, which for a unidirectional servovalve can be single quadrant but for a bidirectional servovalve can be two quadrant to preserve the sign of the output of the second divider 122. Note that if it is desired to have a bidirectional servovalve act as an unidirectional servovalve, the only change needed is to replace the two quadrant function generator by a single quadrant function generator so as to generate only a single polarity command signal.

The output voltage, $E_s$, from the square root function generator 124 is amplified (or attenuated) by amplifier 126 which has a gain R defined in EQ (9). This sets the magnitude of the resulting damping coefficient to the proper scaling magnitude, such that the damping coefficient when $E_X$ is zero is equal to the damping coefficient Zetazero of the vibration isolation system 10. The resulting voltage signal is fed into the valve controller 128 to control the servovalve's openings' area as given above in EQ (10). It is this signal which is applied as the command signal to control the electro-mechanical means and thereby close the servo-control loop.

I claim:

1. A parametrically controlled active vibration isolation system comprising:
    first means for deriving a first signal representative of the velocity of a payload supported by the system;
    second means for deriving a second signal representative of the velocity of a base on which the system is mounted,
    control means for generating a command signal responsive to said first and second signals;
    a viscous damper having a variable damping coefficient;
    means for modulating the damping coefficient of said viscous damper in response to said command signal, whereby the vibration isolation characteristics of the system may be tailored to approximate a "sky hook" type damper;
    said damper comprising a hydraulic actuator, a hydraulic accumulator, and a servovalve;
    said actuator comprising an actuator cylinder in fluidic communication with said servovalve and a platform support member partially received within said actuator cylinder;
    said accumulator comprising an accumulator cylinder, and a movable diaphragm separating said accumulator cylinder into first and second sub-chambers;
    a hydraulic fluid in said actuator cylinder and said first sub-chamber; and
    a gas filling said second sub-chamber.

2. A parametrically controlled active vibration isolation system according to claim 1 wherein said first deriving means includes a first sensor operatively coupled to said payload and a second sensor operatively coupled to said base.

3. The parametrically controlled active vibration isolation system of claim 1 wherein said first and second deriving means each includes a geophone.

4. The parametrically controlled active vibration isolation system of claim 1 wherein said servovalve includes movable valve means for controllably restricting fluid flow within said viscous damper, and said modulating means comprises electromechanical means for moving said movable valve means in response to said command signal.

5. The parametrically controlled active vibration isolation system of claim 4 wherein a passageway connects said actuator cylinder and said accumulator cylinder, and said movable valve means is disposed to vary the flow area of said passageway as said movable valve means is moved by said modulating means.

6. The parametrically controlled active vibration isolation system of claim 1 wherein said first signal deriving means includes a first sensor mounted to said payload for deriving a velocity signal, $E_x$, representative of the velocity of said payload, and said second signal deriving means includes a second sensor for deriving a velocity signal, $E_U$, representative of the velocity of said base.

7. The parametrically controlled active vibration isolation system of claim 6 wherein said control means includes:

(a) means for subtracting one of said signals $E_X$ and $E_U$ from the other so as to derive a signal $E_d$ representative of the velocity of relative motion of said payload and base;

(b) means for dividing signal $E_X$ by signal $E_d$ and deriving an output signal, $E_R$; and (c) means for dividing signal $E_d$ by signal $E_R$ to generate an output signal;

(d) means for generating a feedback signal representative of the damping coefficient of said damper; and (e) means responsive to said output signal and said second feedback signal for deriving said command signal.

8. The active vibration isolation system of claim 1 wherein said fluidic communication is effected by an orifice extending between and fluidically coupling said actuator cylinder, said servovalve and said first subchamber.

9. The parametrically controlled active vibration isolation system of claim 8 wherein said orifice has an area approximated by:

$$A = R(SQRT[ABS\ dU/(1 + G(ABS(dX/dV)))])$$

where A is the orifice area, R is the system's scaling constant, SQRT is an abbreviation for "square root", ABS is an abbreviation for "absolute value of", dU is the velocity of the base, G is gain, dX is the velocity of the payload, and dV is the relative velocity.

10. The parametrically controlled active vibration isolation system of claim 1 further including means for sensing the relative height of said pay load with respect to said base and for controlling gas pressure within said second subchamber.

11. The parametrically controlled active vibration isolation system of claim 1 wherein said damping coefficient is controlled by said command signal substantially in accordance with:

$$C = C_1(ABS[A(dX/dV)])$$

where C is the damping coefficient, $C_1$ is the damping coefficient when the orifice is fully open, ABS is an abbreviation for "absolute value of", A is the instantaneous area of the orifice, dX is the velocity of the payload and dV is the relative velocity.

12. An active vibration isolation system comprising:

(a) a first geophone operatively associated with a pay load for generating a first velocity signal representative of the velocity of the pay load;

(b) a second geophone operatively associated with a base for generating a second velocity signal representative of the velocity of the base;

(c) a viscous damper having a variable damping coefficient for supporting the payload with reference to the base, said viscous damper including (i) an hydraulic actuator, (ii) an hydraulic accumulator, and (iii) a servovalve comprising a spool arranged to restrict an opening in a passage fluidically coupling said actuator to said accumulator;

(d) means for modulating the damping coefficient of said viscous damper by moving said spool relative to said opening in response to a command signal;

(e) means operatively coupled with said spool for deriving a signal representative of the position of the spool; and (f) circuit means for deriving said command signal dependent upon said first and second velocity signals and said position signal;

said accumulator comprising a first subchamber in hydraulic fluid communication with said passage, a second subchamber containing a compressible fluid, and a diaphragm disposed between said subchambers.

13. The active vibration isolation system of claim 12 wherein the actuator is a rolling-diaphragm type actuator.

14. The active vibration isolation system of claim 13 wherein said actuator includes a cylinder, a support for a payload in telescoping relation with said cylinder, and hydraulic means in said cylinder for supporting said payload support, said hydraulic means being in fluidic communication with said opening.

15. An active vibration isolation system comprising:

(a) first means for deriving a first velocity signal representative of the velocity of a payload to which said first means is operatively coupled;

(b) second means for deriving a second velocity signal representative of the velocity of a base to which said second means is operatively coupled;

(c) a viscous damper connected so as to support said payload relative to said base, said damper including (i) an actuator, (ii) an accumulator, and (iii) a servovalve comprising a spool arranged to restrict an opening in a passage fluidically coupling said actuator to said accumulator;

(d) means for modulating the damping coefficient of said viscous damper by moving said spool relative to said passage in response to a spool command signal, such that vibrations and excitations at resonance are not amplified;

(e) means operatively coupled with said spool for deriving a signal representative of the position of said spool; and (f) circuit means for generating the spool command signal in response to said first and second velocity signals and said position signal.

16. A method for controlling the damping coefficient of a viscous damper that supports a payload relative to a base, said method, comprising the steps of:

(a) deriving a first relative velocity signal representative of the velocity of relative motion between said base and said payload for the reduction of transmitted excitations therebetween;

(b) electro-mechanically modulating the damping coefficient of said viscous damper in response to a command signal;

(c) deriving a second feedback signal representative of the damping coefficient of said damper; and (d) generating the command signal in response to said first relative velocity signal and said second feedback signal, thereby controlling the damping coefficient.

17. The method of claim 16 wherein the step of deriving said first relative velocity signal includes the steps of:

(a) sensing the velocity of said payload and generating a signal representative of the velocity of said payload;

(b) sensing the velocity of said base and generating a signal representative of the velocity of said base; and (c) subtracting said generated signals.

18. The method of claim 17 wherein the step of modulating the damping coefficient of said damper involves moving a valve spool so as to restrict a flow of hydraulic fluid within an orifice in said viscous damper.

19. The method of claim 18 wherein the step of deriving said feedback signal includes the step of sensing the position of the spool relative to said orifice.

20. The method of claim 19 wherein the modulating step includes the steps of applying the command signal as an input signal to an electro-mechanical drive for the valve spool, whereby the spool valve is moved responsively to and in accordance with said command signal.

21. The method of claim 17 wherein the step of generating the command signal includes the steps of:

modifying the signal representative of the velocity of said payload so as to provide a first absolute velocity signal that is representative of the absolute velocity of said payload; modifying the signal representative of the velocity of said base so as to provide a second absolute velocity signal representative of the absolute velocity of said base; combining said first and second absolute velocity signals so as to obtain a third absolute velocity signal representative of the quotient achieved by dividing the absolute value of the velocity of said payload by the absolute value of the velocity of said base;

subtracting said signal representative of the velocity of said base from the signal representative of the velocity of said payload so as to provide a relative velocity signal;

dividing said relative velocity signal by said third absolute velocity signal so as to provide a control signal;

processing said control signal in a square root function generator to obtain a modified control signal; and generating said command signal in response to said modified control signal and said feedback signal.

22. A parametrically controlled active vibration isolation system for controlling vibration of a payload relative to a base, comprising:

first and second sensors for detecting the velocity of said payload and said base and producing first and second signals representative respectively of the velocities of said payload and base;

a damper having a variable damping coefficient, said damper being located between and coupled to said payload and said base, said damper comprising a hydraulic actuator coupled to said payload, a hydraulic accumulator, and servovalve means for modulating hydraulic flow between said actuator and said accumulator and thereby vary the damping coefficient of said damper, said servovalve comprising an orifice for flow of hydraulic fluid between said actuator and accumulator and a valve member movable so as to vary the area of said orifice and thereby modulate said flow of hydraulic fluid;

electrical means for operating said servovalve in response to a command signal so as to cause said valve member to move and thereby modulate flow of hydraulic fluid between said actuator and said accumulator in accordance with said command signal;

means, including a summing circuit, responsive to said first and second signals for producing a control signal varying in accordance with the ratio dX/dV, where dX is the velocity of the payload and dV is the relative velocity of the payload with respect to said base;

signal processing means responsive to said control signal for producing a command signal that is adapted to cause said electrical means to operate said servovalve so that said flow of hydraulic fluid is controlled in accordance with the following equation:

$$A = R(SQRT[ABS\ dU/(1+G(ABS(dX/dV)))])$$

where A is the orifice area, R is the system's scaling constant, SQRT is an abbreviation for "square root", ABS is an abbreviation for "absolute value of", dU is the velocity of the base, G is gain, dX is the velocity of the payload, and dV is the relative velocity; and means for continuously applying said command signal to said electrical means so as to cause said servovalve to modulate flow of hydraulic fluid between said actuator and said accumulator in accordance with changes in said command signal.

23. A system according to claim 22 wherein said sensors are geophones.

24. A system according to claim 22 wherein:

(a) said system includes means responsive to movement of said valve member for deriving a feedback signal, and (b) said signal processing means is responsive to said feedback signal.

25. A parametrically controlled active vibration isolation system comprising:

first means for producing a first signal representative of the velocity of a payload supported on a base;

second means for producing a second signal representative of the velocity of said base;

an electromechanical viscous damper having a variable damping coefficient, said damper being interposed between said payload and said base so as to dampen vibrations of said payload relative to said base;

said damper comprising a hydraulic actuator, a hydraulic accumulator connected to said actuator so as to permit flow of hydraulic fluid therebetween, and servovalve means for controlling flow of hydraulic fluid between said accumulator and said actuator;

said servovalve means comprising (1) an orifice through which hydraulic fluid may flow between said actuator and said accumulator, (2) movable valve member means, and (3) means confining movement of said valve member means so that movement of valve member means will cause a change in the flow area of said orifice;

an electronic controller means for moving said movable valve member means responsive to an input command signal;

means for generating a feedback signal in response to the position of said valve member means;

means responsive to both said first and second signals for generating a signal $E_d$ representative of the relative velocity dV of the payload, where dV is the difference between the velocity dU of the base and the velocity dX of the payload;

means responsive to said first signal and said signal $E_d$ for producing a signal $E_R$ which is representative of the ratio $dX/dV$;

signal processing means responsive to said feedback signal, said signal $E_R$, and said signal $E_d$ for producing a command signal; and means for applying said command signal to said controller means so as to cause said controller means to move said movable valve member means and thereby vary the flow area between said actuator and said accumulator in accordance with changes in said command signal, whereby to vary the damping coefficient of said damper in accordance with the vibration of said payload relative to said base.

26. An active vibration isolation system according to claim 25 wherein said actuator comprises a cylinder containing a hydraulic fluid and an actuating member that is movably mounted in said cylinder so as to respond to hydraulic pressure and has a portion projecting from said cylinder that is connected to said payload in supporting relation therewith.

27. A parametrically controlled vibration isolation system according to claim 25 wherein said signal processing means produces a command signal that provides a damping coefficient for said damper according to an equation of motion for the system which is approximately:

$$M(d^2X) = K(U-X) - C_1 A[ABS(dX)]\text{DELTA}$$

where M is the payload mass, $d^2X$ is the acceleration of the payload, K is the spring stiffness constant, U is the displacement of the base, X is the displacement of the payload, A is the instantaneous area of the variable orifice, ABS is an abbreviation for "absolute value of", dX is the velocity of the payload, and DELTA is plus or minus one.

* * * * *